United States Patent [19]

Bricko et al.

[11] 4,327,539
[45] May 4, 1982

[54] CONTROL SYSTEM FOR POWER EQUIPMENT

[75] Inventors: Thomas K. Bricko, Apple Valley; Jeffrey B. Kallevig, Eden Prairie, both of Minn.

[73] Assignee: The Toro Company, Minneapolis, Minn.

[21] Appl. No.: 216,885

[22] Filed: Dec. 16, 1980

[51] Int. Cl.³ .............................................. A01D 75/20
[52] U.S. Cl. ........................................ 56/113; 56/10.8
[58] Field of Search ...................... 56/10.8, 11.3, 11.8, 56/11.7

[56] References Cited

U.S. PATENT DOCUMENTS

| | | | |
|---|---|---|---|
| 3,903,679 | 9/1975 | Sorenson et al. | 56/11.8 |
| 4,016,709 | 4/1977 | Hauser et al. | 56/11.8 |
| 4,122,652 | 10/1978 | Holdarmann | 56/11.8 |
| 4,159,614 | 7/1979 | Thomas et al. | 56/11.8 |
| 4,212,141 | 7/1980 | Miyazawa et al. | 56/11.8 |
| 4,255,879 | 3/1981 | Greidan | 37/43 R |

FOREIGN PATENT DOCUMENTS

| | | | |
|---|---|---|---|
| 1273572 | 5/1972 | United Kingdom | 56/11.8 |
| 799582 | 8/1958 | United Kingdom | 56/10.8 |

*Primary Examiner*—Paul J. Hirsch
*Attorney, Agent, or Firm*—James W. Miller

[57] ABSTRACT

Control system (2) for an outdoor power equipment unit includes a pivotal control member (10) having a pivotal traction drive link (20) for actuating a traction drive of the unit and a pivotal clutch link (22) for actuating an active element of the unit. A latch (40) rotatively couples the clutch link (22) to control member (10) only when control member (10) has first been moved from a neutral position to a cocked position. Rotation of control member (10) from the cocked position towards the fully engaged position then rotates the clutch link (22) to actuate the clutch. The traction drive link (20) can be operated either alone or in combination with the clutch link (22). Any rotation of control member (10) from its neutral position towards its fully engaged position will rotatively couple the traction drive link (20) thereto to actuate the traction drive.

19 Claims, 6 Drawing Figures

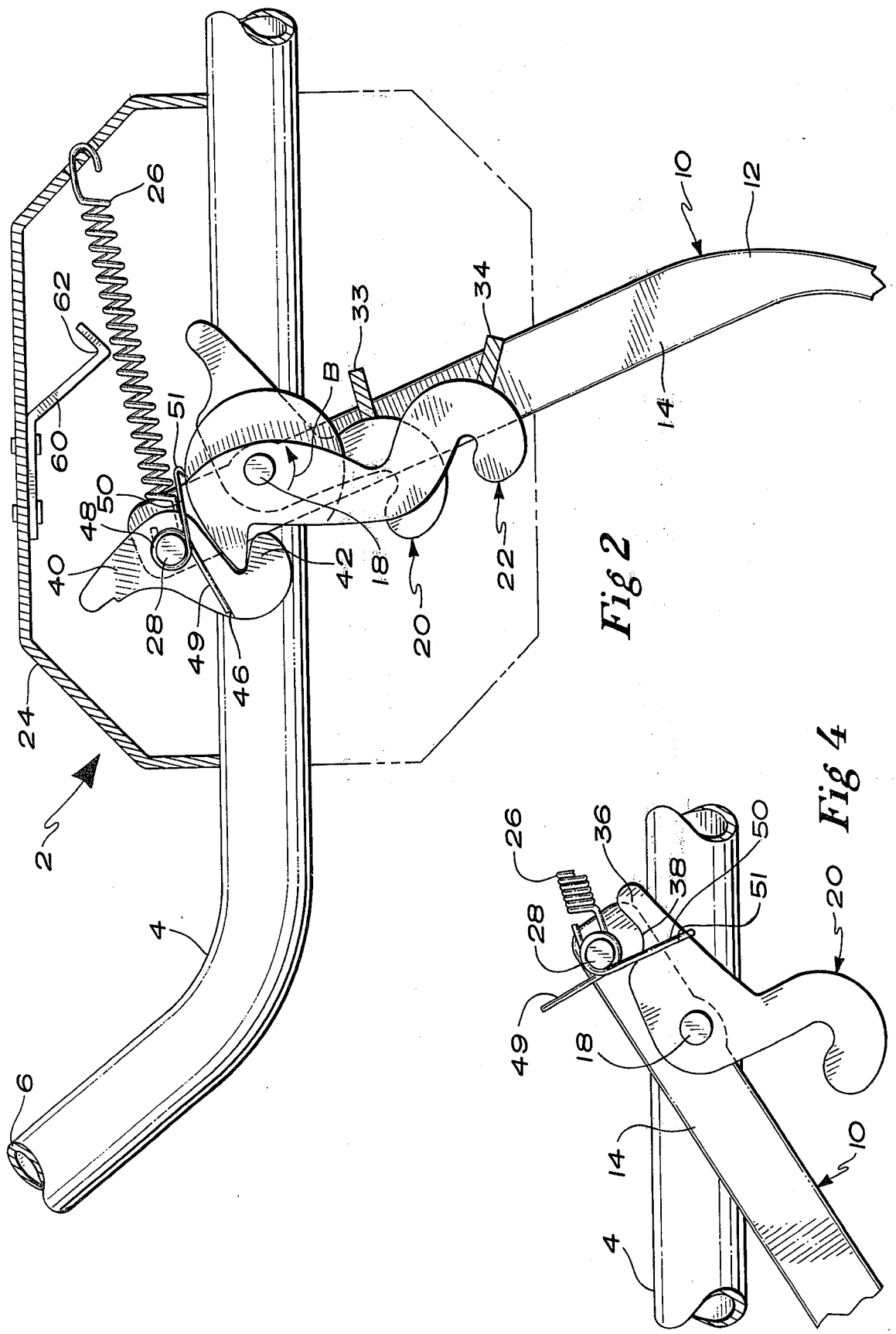

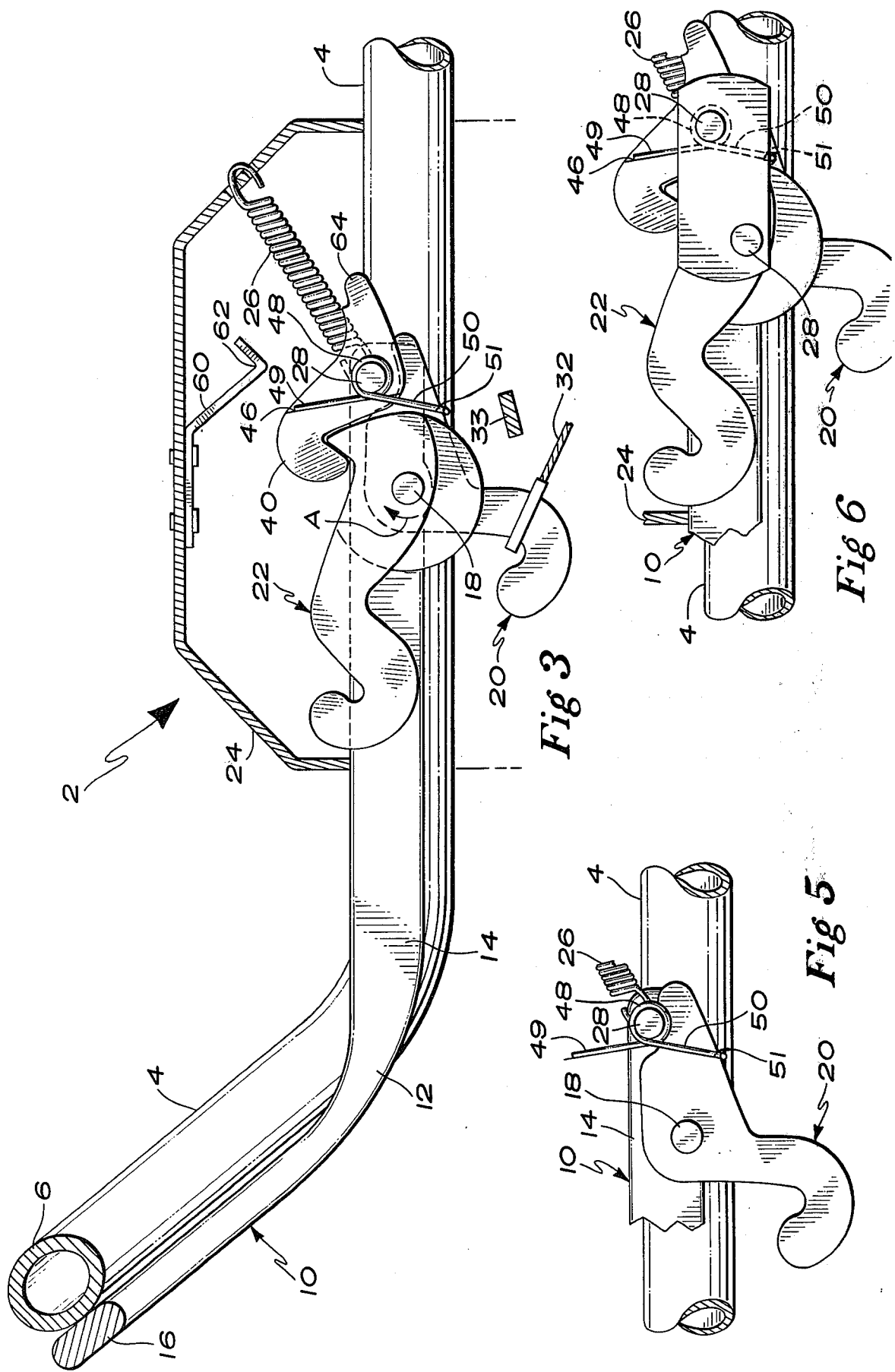

CONTROL SYSTEM FOR POWER EQUIPMENT

TECHNICAL FIELD

This invention relates generally to a control system for an outdoor power equipment unit of the type having a power driven active element and a traction drive. More particularly, this invention relates to a control system for a lawn mowing device having a rotatable cutting element, a brake clutch device for the cutting element and a traction drive for the mower housing.

BACKGROUND OF THE INVENTION

Rotary lawn mowers are known which comprise a mower housing, a rigid cutting blade rotatable in a cutting chamber in the housing and a traction drive for self-propelling the mower housing over the ground. Such machines may have a dead-man's control for operating the traction drive. Such a control is offered on certain lawn mowers manufactured by The Toro Company, Minneapolis, Minn., the assignee of the present invention. This type of control usually comprises a pivotally mounted control bar carried on the handle assembly of the mower. Whenever the operator releases the bar, the control bar falls to a neutral position in which the traction drive is disengaged.

Lawn mowers which use a rigid steel blade as the cutting element present a safety problem. Such a blade when rotating is capable of doing injury to the operator. Operators have had fingers or toes injured or severed by this type of blade. Such accidents will occur either due to the carelessness of the operator or by virtue of an unforeseen set of circumstances leading to the injury. It is, therefore, desirable that any lawn mower having a rigid cutting element such as a blade be equipped with a blade brake clutch for stopping the cutting blade whenever it poses a danger to the operator. Some prior art lawn mowers have been equipped with such blade brake clutches. In addition, some of these lawn mowers used a dead-man's control for actuating the blade brake clutch.

To the best of Applicants' knowledge every lawn mower having both a traction drive and a blade brake clutch has utilized two separate dead-man's controls for actuating these two elements individually. This is duplicative of materials and, therefore, relatively expensive. Moreover, it also presents two separate controls each of which must be manually actuated by the operator to get both the traction drive function and rotation of the cutting blade. This may be confusing and cumbersome to some operators.

Moreover, a simple pivotal dead-man's control can be actuated in only one single uninterrupted motion. This is disadvantgageous since it is conducive to inadvertent actuation of the control. Instead, it would be preferable that two separate actions must be performed on the control member in order to obtain blade rotation. To accomplish this it is necessary to install a latch or the like on a conventional dead-man's control which must first be released before the control can be pivoted. The two action requirement is thus met by the first movement of releasing the latch and the second movement of moving the control. Again, insofar as another element is required, i.e. the latch for the control, this is relatively expensive and unduly complex.

SUMMARY OF THE INVENTION

One aspect of this invention is the provision of a control system for any piece or unit of outdoor power equipment having an active element for performing a ground grooming function and a traction drive. This invention relates to such a control system in which only a single moveable control member is required for actuating either the traction drive or the active element. Preferably, the control member of this invention allows for separate actuation of the traction drive and for actuation of the active element only after a cocking action of the control member has been performed.

This invention relates to an improved outdoor power equipment unit of the type having a housing. An active power driven element is carried on the housing for performing a ground grooming action. A clutch means is provided for selectively activating the active element. In addition, the housing carries selectively operable traction drive means for moving the housing over the ground. The improvement relates to a single moveable control member for activating the traction drive means and the clutch means. This control member is mounted on the housing at a position which is accessible to an operator for manual manipulation thereof. The control member includes means for activating the traction drive means alone and for activating both the traction drive means and clutch means simultaneously.

BRIEF DESCRIPTION OF THE DRAWINGS

This invention will be described in more detail hereafter, when taken in conjunction with the following drawings, in which like reference numerals will refer to like elements throughout.

FIG. 2 is a side elevational view similar to that of FIG. 1, particularly illustrating the control member in its cocked position with the latch carried on the control member being brought into engagement with the clutch link;

FIG. 3 is a side elevational view similar to that shown in FIGS. 1 and 2, particularly illustrating the control member in its fully engaged position and the corresponding positions of the clutch and traction drive links thereat;

FIG. 4 is a side elevational view of a portion of the control system shown in FIG. 1, particularly illustrating the system with the clutch link removed to show specifically the traction drive link and the pin for coupling the traction drive link to the control member for rotation therewith with the parts being shown in the neutral position of the control member;

FIG. 5 is a side elevational view similar to FIG. 4, particularly illustrating the engagement of the pin on the traction drive link in the fully engaged position of the control member; and FIG. 6 is a side elevational view of the control system shown in FIG. 1, particularly illustrating the keeper plate installed on one side of the traction drive and clutch links for retaining these links on the control member.

DETAILED DESCRIPTION

Figure 1:
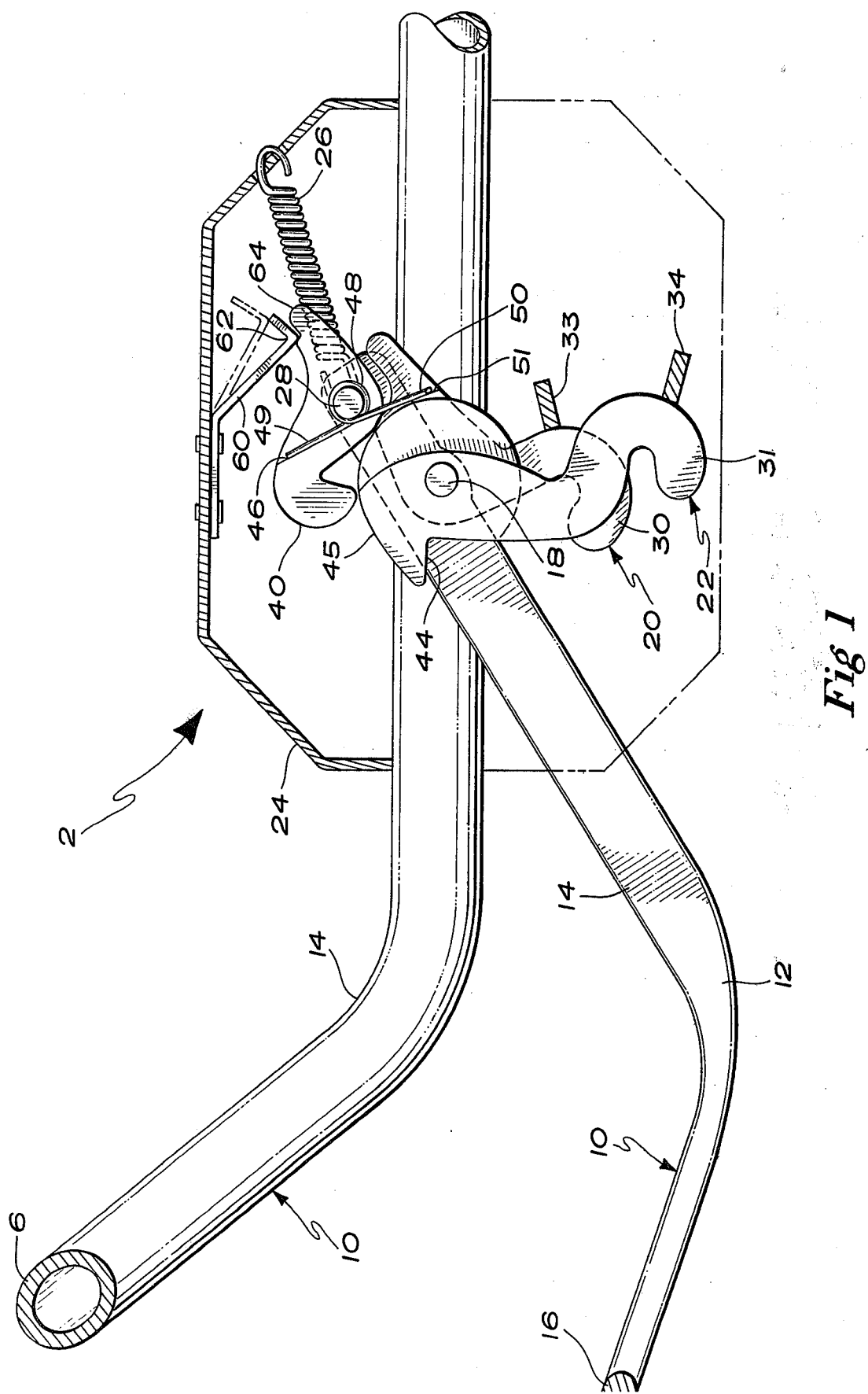
FIG. 1 is a side elevational view partly shown in cross-section of an improved control system according to this invention for an outdoor power equipment unit, particularly illustrating the pivotal control member of the invention in its neutral position.

Referring to FIGS. 1-3, an improved control assembly or system according to this invention is generally illustrated as 2. Control system 2 is mounted on the handle assembly of an outdoor power equipment unit (not shown). The handle assembly is generally U-shaped having two upwardly extending handle rods 4 joined together at their upper ends by a cross rod 6. The operator holds onto cross rod 6 to guide the outdoor power equipment unit during operation thereof. Control system 2 is located on the handle rods 4 near cross rod 6 so as to be easily accessible to the operator.

The outdoor power equipment unit on which the control system 2 is used preferably comprises a lawn mower (not shown). More specifically, the lawn mower which will be used with control system 2 comprises a wheeled housing for movement over the ground, a rotatable cutting element carried in a cutting chamber in the housing for severing grass or other vegetation at a pre-determined height above the ground, a brake and clutch means for selectively rotating the cutting element, a traction drive means for self-propelling the housing over the ground, and a motor means for operating both the rotatable cutting element and the traction drive means. Typically, the rotatable cutting element comprises a rigid steel blade. The handle rods 4 of the handle assembly connect at their lower ends to the housing of the lawn mower and form, in effect, a part thereof. Any conventinal lawn mower of this type may be used in conjunction with control system 2.

In addition to powered lawn mowers of the type noted above, control system 2 can also be used with other types of outdoor power equipment units. Such a unit should, however, have a housing self-propelled by a traction drive means and an active element actuated by a clutch means for performing some type of ground grooming action. For example, motorized rakes and the like are well known for raking leaves and certain specialized rakes are known for raking the sand in traps on golf courses. Insofar as such raking elements would constitute the active element and insofar as such a unit would have a self-propelled housing, control system 2 would be equally applicable thereto. In addition, certain snow throwers have both a drive means for the device and an active snow throwing element which can be selectively operated by a clutch means. Control system 2 could be applied to such a snow thrower as well. Thus, while the primary intended embodiment for use with control system 2 is a powered lawn mower of the self-propelled type, control system 2 is certainly not limited for use with such equipment.

Control system 2 comprises a moveable control member 10 mounted on the handle assembly of the power equipment unit. Control member 10 is U-shaped and includes two longitudinal rods 14 connected at their upper ends by a cross rod 16. A bend 12 is placed in each of the longitudinal rods 14 so that control member 10 mimics the shape of the handle assembly adjacent its upper end. Control member 10 is movable in the sense that it is pivotally mounted on the handle assembly. Each of the longitudinal rods 14 is pivotally mounted by a pivot shaft 18 to one of the handle rods 4 generally adjacent the upper end of the handle assembly. Only one longitudinal rod 14 and pivot shaft 18 has been illustrated in FIGS. 1-3. It should be remembered that an identical longitudinal rod 14 and pivot shaft 18 is pivotally secured to the other handle rod 4 of the handle assembly.

Control system 2 includes a traction drive link 20 and a clutch link 22 for activating respectively the traction drive means and the brake and clutch means of the lawn mower. Links 20 and 22 are freely and pivotally journalled side by side on one of the pivot shafts 18 for control member 10. An outer housing 24 is mounted on one of the handle rods 4 surrounding and enclosing links 20 and 22. The lower end of the longitudinal rod 14 on which the links 20 and 22 are mounted extends into housing 24 through a suitable slot or opening. This slot is elongated to allow pivotal motion of control member 10 as described hereafter. Housing 24 may have any suitable shape.

Control member 10 is pivotal on its pivot shafts 18 in two generally opposed directions indicated by the arrows A and B. FIG. 1 illustrates a neutral position of control member 10. Control member 10 is normally retained in this neutral position by a spring 26. Spring 26 extends between the housing 24 of control system 2 and a pin 28 contained on the lower end of control member 10. Any suitable biasing means may be used in place of spring 26. In any event, control member 10 can be rotated in the direction of arrow A from its neutral position to a fully engaged position shown in FIG. 3. Similarly, control member 10 can be reversely rotated in the reverse direction shown by the arrow B from its neutral position to a cocked position illustrated in FIG. 2. The significance of all three positions of control member 10 will be explained in more detail hereafter.

Each of the links 20 and 22 have hooks 30 and 31 respectively formed adjacent their lower ends. Hooks 30 and 31 face rearwardly, i.e. towards the cross bar 6 of the handle assembly. Each of the hooks 30 and 31 receives thereon the eyelet of a cable 32 which leads therefrom to the traction drive means and the brake and clutch means respectively. Only one cable 32 is shown in FIG. 3 with both cables 32 having free egress through slots or the like in housing 24. Rotation of the links 20 and 22 in the direction of arrow A will longitudinally move the cables 32 to actuate the traction drive means and the brake and clutch means.

In addition, each of the cables 32 is under spring tension to normally rotate links 20 and 22 back against stops 33 and 34 respectively contained in housing 24. Stops 33 and 34 retain links 20 and 22 in initial positions which correspond to unactuated conditions of both the traction drive means and brake and clutch means respectively when control member 10 is in its neutral position. Thus, in the position shown in FIG. 1, the traction drive means is not engaged and the brake and clutch means is in a condition in which the cutting element is not rotating with the clutch means disengaged and the brake means engaged.

Normally, traction drive link 20 and clutch link 22 are both freely received on pivot shaft 18 so as not to be rotatable with control member 10. However, means is provided for coupling the traction drive link 20 to the control member 10 for rotation therewith whenever the control member is rotated from its neutral position towards its fully engaged position. Referring to FIGS. 4 and 5, this coupling means comprises the pin 28 on the lower end of control member 10 and an outwardly extending finger 36 on traction drive link 20 having a semi-circular recess 38 for receiving pin 28. Pin 28 is normally spaced above recess 38 in the neutral position of control member 10 as shown in FIG. 4. However, as control member 10 rotates in the direction of arrow A, pin 28 will be rotated at some point down into engagement with recess 38. After such an engagement, any further rotation of control member 10 in the direction of arrow A will then also rotate traction drive link 20 to pull on the actuating cable 32. This actuates the traction drive means. FIG. 5 illustrates traction drive link 20 after it has been rotated.

A means is also provided for rotatably coupling clutch link 22 to control member 10. However, in distinction to traction drive link 20, clutch link 22 is coupled to control member 10 only when control member 10 is first reversely rotated to its cocked position shown in FIG. 2. The coupling means for clutch link 22 comprises a hookshaped latch 40 rotatably received on pin 28. Latch 40 has a hook 42 which is suited to engage an outwardly extending shoulder 44 on clutch link 22. An arcuate head or surface 45 is provided on clutch link 22 adjacent shoulder 44. See FIG. 1.

Latch 40 also has a shoulder or rib defining a bearing surface 46. A torsion spring 48 is also received around pin 28. Torsion spring 48 has one side 49 thereof in engagement with the bearing surface 46. The other side 50 of torsion spring 48 has an outwardly extending end 51. End 51 is hooked on the bottom of a keeper plate 52 which is received around both shaft 18 and pin 28 on the inside of the links 20 and 22 and latch 40 to help retain these elements on shaft 18 and pin 20. See FIG. 6. Torsion spring 48 biases the hook 42 of latch 40 into engagement with the arcuate surface 45 of clutch link 22.

Referring now to FIG. 1 which illustrates control member 10 in its neutral position, normally latch 40 has hook 42 biased into engagement with the surface 45 of clutch link 22. When control member 10 is rotated in the direction of arrow B, latch 40 will be moved or rotated around the stationary clutch link 22 until control member 10 reaches its cocked position. In this position the hook 42 of latch 40 "catches" or engages on shoulder 44 of clutch link 22 helped by the pressure of torsion spring 48. Then, any rotation of control member 10 back in the direction of arrow A serves to rotate clutch link 22 also. This will effect a longitudinal movement of the cable 32 associated with the clutch link 22 to deactivate the brake means and actuate the clutch means to begin rotation of the cutting element. If control member 10 is rotated all the way back to its fully engaged position of FIG. 3, this rotation will also actuate the traction drive link in the manner noted earlier to also start the traction drive means and self-propel the housing of the lawn mower. Preferably, actuation of the brake and clutch means occurs before actuation of the traction drive means during movement of the control member 10 from its cocked position all the way back to its fully engaged position. This starts the cutting element spining before the traction drive is put into engagement. Obviously, if rotation of control member 10 is stopped at this point, cutting element actuation will be achieved without activation of the traction drive, which may be desirable in some situations.

A means is provided for releasing the latch 40 as the control member 10 rotates from the fully engaged position of FIG. 3 back to its neutral position of FIG. 1. This releasing means comprises a leaf spring 60 mounted on housing 24. The outer end 62 of leaf spring 60 will engage against a shoulder 64 on latch 40 during rotation of the control member 10 from the fully engaged position in FIG. 3 back towards its FIG. 1 position. This engagement will exert sufficient force on latch 40 to reversely rotate it relative to clutch link 22 against the biasing force of spring 48 until the hook 42 disengages from shoulder 44. Clutch link 22 when disengaged from latch 40 will then reset to its initial position against stop 34 due to the spring tension on cable 32. However, spring 60 does not prevent rotation of the latch 40 to its cocked position in FIG. 2 since the shoulder 64 is rounded and acts as a cam on the outer end 62 of spring 60 during rotation of control member 10 from its FIG. 1 position to the cocked position shown in FIG. 2. The phantom line illustration of leaf spring 60 in FIG. 1 illustrates how it is cammed upwardly by the rounded portion of the shoulder 64 during rotation of control member 10 in the direction of arrow B.

Control system 2 according to this invention is particularly advantageous for a number of reasons. First of all, it allows the operation of both the traction means and the brake and clutch means of a powered lawn mower using a single moveable control member 10. This is an improvement over the Prior Art arrangement of using two separate control bars for each function. It is less comlex and thus simpler to operate and less expensive to manufacture. In addition, this invention allows the use of a single control member to also operate the traction drive means separately or simultaneously with the brake and clutch means. Thus, simply by rotating the control member 10 from its neutral to its fully engaged position, the operator can obtain operation of the traction drive alone without operation of the brake and clutch means. This will allow him to move the lawn mower across a driveway or the like without rotating the cutting element and without picking up any of the loose gravel or rocks which might by on the driveway. This is a desirable feature.

Moreover, control system 2 according to this invention also allows one to rotate the cutting element by actuating the brake and clutch means only after two distinct movements of the control member 10. These movements comprise a cocking action by reversely rotating the control member from its neutral to its cocked position, and then an actuating action by rotating the control member from its cocked position back towards its fully engaged position. Thus, two distinct actions are easily and simply provided by the single moveable control member of this invention. Thus, the control member 10 is hard to inadvertently actuate since two actions are needed to get blade rotation. Safety is thus enhanced. And again, control member 10 is efficient in terms of design in both the amount of materials required and the fact that a separate latch is not required for the control member 10. For all of these reasons, control system 2 according to this invention is particularly advantageous.

The components of control system 2 may be made of any suitable materials. For example, control member 10 itself may be formed of metallic materials while the traction drive link 20, clutch link 22 and latch 40 may be made from suitably rigid plastic materials. In addition, while pivotal motion of the control member is preferred, other motions of control member 10, e.g. a reciprocating motion, might also be used as long as such motions go in at least two separate directions to allow one to cock the control member by movement in one direction and to actuate it by movement in the other direction.

In addition, spring 26 and latch 60 could have any suitable construction. For example, spring 26 could preferably comprise a buckling type compressing spring which has to be buckled to accommodate movement of control member 10 from its neutral position of FIG. 1 to its cocked position of FIG. 2, i.e. spring 26 is attached between the rear or right side of housing 24 in FIG. 1 and a point on control member 10 beneath shaft 18 as seen in FIG. 1. Such a spring 26 requires a high force to buckle the spring when beginning movement of control member 10 to its cocked position to give the operator a detent feeling at this point in the movement of control member 10. Thereafter, such a spring gives low constant force when returning control member 10 from the cocked position to the neutral position. Accordingly, the scope of this invention is to be limited only by the appended claims.

We claim:

1. An improved outdoor power equipment unit of the type having a housing; an active power driven element carried on the housing for performing a ground grooming action; and clutch means for selectively activating the active element, wherein the improvement comprises:
   (a) a movable control member mounted on the housing and which is accessible to an operator for manual manipulation thereof, wherein the control member has a neutral position and is movable in two separate first and second directions therefrom; and
   (b) means for activating the clutch means when the control member moves out of its neutral position in the first direction only when the control member has also first been moved from the neutral position in the second direction in a cocking type action, whereby the clutch means is operated by the control member only when the control member has first been cocked in the second direction before movement of the control member from the neutral position in the first direction.

2. An improved outdoor power equipment unit as recited in claim 1, wherein the first and second directions comprise generally opposed directions.

3. An improved outdoor power equipment unit as recited in claim 1, wherein the control member is pivotally mounted on the housing.

4. An improved outdoor power equipment unit as recited in claim 3, wherein the activating means comprises:
   (a) a clutch link for actuating the clutch means, wherein the clutch link is pivotally journalled on the control member for free rotation relative thereto; and
   (b) a latch carried on the control member for engaging the clutch link when the control member is in a cocked position to rotatively couple the clutch link to the control member.

5. An improved outdoor power equipment unit of the type having a housing; an active power driven element carried on the housing for performing a ground grooming action; clutch means for selectively activating the active element; and selectively operable traction drive means for moving the housing over the ground, wherein the improvement comprises:
   (a) a movable control member mounted on the housing and which is accessible to an operator for manual manipulation thereof, wherein the control member has a neutral position and is movable in two separate first and second directions therefrom;
   (b) means for actuating the traction drive means whenever the control member is moved out of its neutral position in the first direction; and
   (c) means for activating the clutch means when the control member moves out of its neutral position in the first direction only when the control member has also first been moved from the neutral position in the second direction in a cocking type action, whereby the traction drive means may be operated either alone or in conjunction with the clutch means depending on whether the control member has first been cocked in the second direction before movement of the control member from the neutral position in the first direction.

6. An improved lawn mowing device of the type having a housing; a rotatable power driven cutting element carried on the housing for cutting grass or the like; a brake and clutch means for selectively rotating the cutting element and for selectively bring the cutting element to a halt; and selectively operable traction drive means for moving the housing over the ground, wherein the improvement relates to a control system for operating both the traction drive means and the brake and clutch means, which comprises:
   (a) a movable control member mounted on the housing and which is accessible to an operator for manual manipulation thereof, wherein the control member has a neutral position and is moveable in two separate first and second directions therefrom;
   (b) means for actuating the traction drive means whenever the control member is moved out of its neutral position in the first direction; and
   (c) means for activating the brake and clutch means when the control member moves out of its neutral position in the first direction only when the control member has also first been moved from the neutral position in the second direction in a cocking type action, whereby the traction drive means may be operated either alone or in conjunction with the brake and clutch means depending on whether the control member has first been cocked in the second direction before movement of the control member from the neutral position in the first direction.

7. An improved lawn mowing device as recited in claim 6, wherein the first and second directions comprise generally opposed directions.

8. An improved lawn mowing device as recited in claim 7, wherein the control member is pivotally mounted on the housing.

9. An improved outdoor power equipment unit of the type having a housing; an active power driven element carried on the housing for performing a ground grooming action; clutch means for selectively activating the active element; and selectively operable traction drive means for moving the housing over the ground, wherein the improvement comprises:
   a single movable control member for activating the traction drive means and the clutch means, wherein the control member is pivotally mounted on the housing at a position which is accessible to an operator for manual manipulation thereof, and wherein the control member includes means for activating the traction drive means alone and for activating both the traction drive means and clutch means simultaneously, wherein the activating means comprises:
   (a) a clutch link and a traction drive link for actuating respectively the clutch means and traction drive means, wherein the clutch and traction drive links are both pivotally journalled on the control member for free rotation relative thereto; and (b) wherein the control member is pivotal about its pivot axis in first and second generally opposed directions, and wherein the control member has a neutral position located between a fully engaged position and a cocked position such that the fully engaged position is reached by rotation of the control member from its neutral position in one direction and the cocked position is reached by rotation of the control member from its neutral position in the other generally opposed direction.

10. An improved outdoor power equipment unit as recited in claim 1, further including means for normally retaining the control member in its neutral position.

11. An improved outdoor power equipment unit as recited in claim 10, wherein the retaining means comprises a spring for biasing the control member to its neutral position.

12. An improved outdoor power equipment unit as recited in claim 1, further including means for retaining the clutch and traction drive links in initial positions when the control member is in its neutral position which initial positions correspond to unactuated conditions of the clutch means and traction drive means respectively.

13. An improved outdoor power equipment unit as recited in claim 1, further including means for coupling the traction drive link to the control member for rotation therewith every time the control member rotates from its neutral position towards its fully engaged position to thereby rotate the traction drive link and actuate the traction drive means.

14. An improved outdoor power equipment unit as recited in claims 1 or 13, further including means for selectively coupling the clutch link to the control member for rotation therewith when the clutch member rotates from its cocked position towards its fully engaged position to rotate the clutch link and actuate the clutch means.

15. An improved outdoor power equipment unit as recited in claim 14, wherein the clutch link coupling means includes a latch carried on the control member for engaging the clutch link when the control member is in its cocked position to rotatively couple the clutch link to the control member.

16. An improved outdoor power equipment unit as recited in claim 15, wherein the latch is hook-shaped to engage an outwardly extending shoulder on the clutch link, and further including means for biasing the hook-shaped latch into engagement with a surface of the clutch link adjacent the shoulder to force the hook-shaped latch onto the shoulder when the control member reaches its cocked position.

17. An improved outdoor power equipment unit as recited in claim 15, further including means for releasing the latch from engagement with the clutch link as the control member rotates from its fully engaged position back towards its neutral position to allow the clutch link to reset to its initial position.

18. An improved outdoor power equipment unit as recited in claim 13, wherein the traction drive link coupling means comprises a pin on the control member normally spaced from the traction drive link in the neutral position of the control member and which moves down into engagement with the traction drive link as the control member rotates from its neutral position towards its fully engaged position to rotate the traction drive link therewith, and wherein the pin disengages the traction drive link as the control member rotates back towards its neutral position from its fully engaged position to allow the traction drive link to reset to its initial position.

19. An improved outdoor power equipment unit as recited in claims 12 or 13, further including means for biasing the clutch links and the traction drive links into their initial positions.

* * * * *